United States Patent
Ouchi et al.

(10) Patent No.: US 6,172,707 B1
(45) Date of Patent: *Jan. 9, 2001

(54) IMAGE PICKUP DEVICE

(75) Inventors: Toshimichi Ouchi, Yokohama; Akihiro Fujiwara, Yokosuka; Tsuyoshi Morofuji, Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/807,826

(22) Filed: Feb. 27, 1997

Related U.S. Application Data (63) Continuation of application No. 08/447,103, filed on May 22, 1995, now abandoned, which is a continuation of application No. 08/078,565, filed on Jun. 17, 1993, now abandoned.

(30) Foreign Application Priority Data

Jun. 22, 1992 (JP) .................................................... 4-162525
Jun. 29, 1992 (JP) .................................................... 4-196335

(51) Int. Cl.[7] .................................................... H04N 5/228
(52) U.S. Cl. .......................... 348/208; 348/240; 348/358
(58) Field of Search .................................. 348/208, 240, 348/358, 155, 369, 335; 358/451; H04N 5/225, 5/232

(56) References Cited

U.S. PATENT DOCUMENTS

| 4,584,610 | * | 4/1986 | Mizokami et al. ................... 348/229 |
| 4,771,473 | * | 9/1988 | Sugiura ............................... 382/298 |
| 4,843,475 | * | 6/1989 | Imai . | |
| 4,963,981 | * | 10/1990 | Todaka et al. ........................ 348/240 |
| 5,060,074 | * | 10/1991 | Kinugasa et al. .................... 348/208 |
| 5,107,334 | * | 4/1992 | Matsumoto ........................... 348/561 |

FOREIGN PATENT DOCUMENTS

| 2250470 | * | 3/1989 | (JP) .............................. H04N 5/232 |
| 4316286 | * | 6/1992 | (JP) .............................. H04N 5/232 |
| 4316286 | * | 11/1992 | (JP) .............................. H04N 5/232 |

OTHER PUBLICATIONS

Automatic Image Stabilizing System by Full–Digital Signal Processing—Uomori et al. IEEE Trans. on Cons. Elect. Aug. 1990.*

* cited by examiner

Primary Examiner—Tuan V. Ho
(74) Attorney, Agent, or Firm—Robin, Blecker & Daley (57) ABSTRACT

An image pickup device provided with an electronic image vibration compensating circuit, comprising an electronic zooming device for electronically varying the magnification of a designated portion of a taken image, a zoom lens constituting a phototaking lens, a zoom position detector for detecting the zoom position of the zoom lens, a driving circuit for zooming the zoom lens, and a control circuit for controlling the zoom lens and the electronic zooming device in mutually correlated manner, so as to maintain the image angle, determined by the zoom lens and the electronic zooming device at a predetermined value.

20 Claims, 11 Drawing Sheets

IMAGE PICKUP DEVICE

This is a continuation application under 37 CFR 1.62 of prior application Ser. No. 08/447,103, filed May 22, 1995, now abandoned, which is a continuation application under 37 CFR 1.62 of prior application Ser. No. 08/078,565, filed Jun. 17, 1993 now abandoned.

BACKGROUND OF THE INVENTION

1. Field of the Invention

The present invention relates to an image pickup device, and more particularly to an image pickup device provided with electronic zooming means and electronic image vibration compensating means, adapted for use in a video camera or the like.

2. Related Background Art

In an image pickup device for converting an optical image into an electrical signal, the image vibration or the object movement can be detected by a calculation between the frames of the image signal, and the image vibration can be reduced by means of the detected movement vector. The prevention of image vibration can be achieved by an optical configuration in which the vertical angle of a variable-angle prism is controlled according to the detected image vibration, thereby optically compensating the image vibration, or an electronic configuration in which a partial image compensating the image vibration is extracted from an image stored in an image memory and is released as an output in the normal size. The latter is also known as the electronic zooming function for electronically enlarging the taken image.

Figure 1:
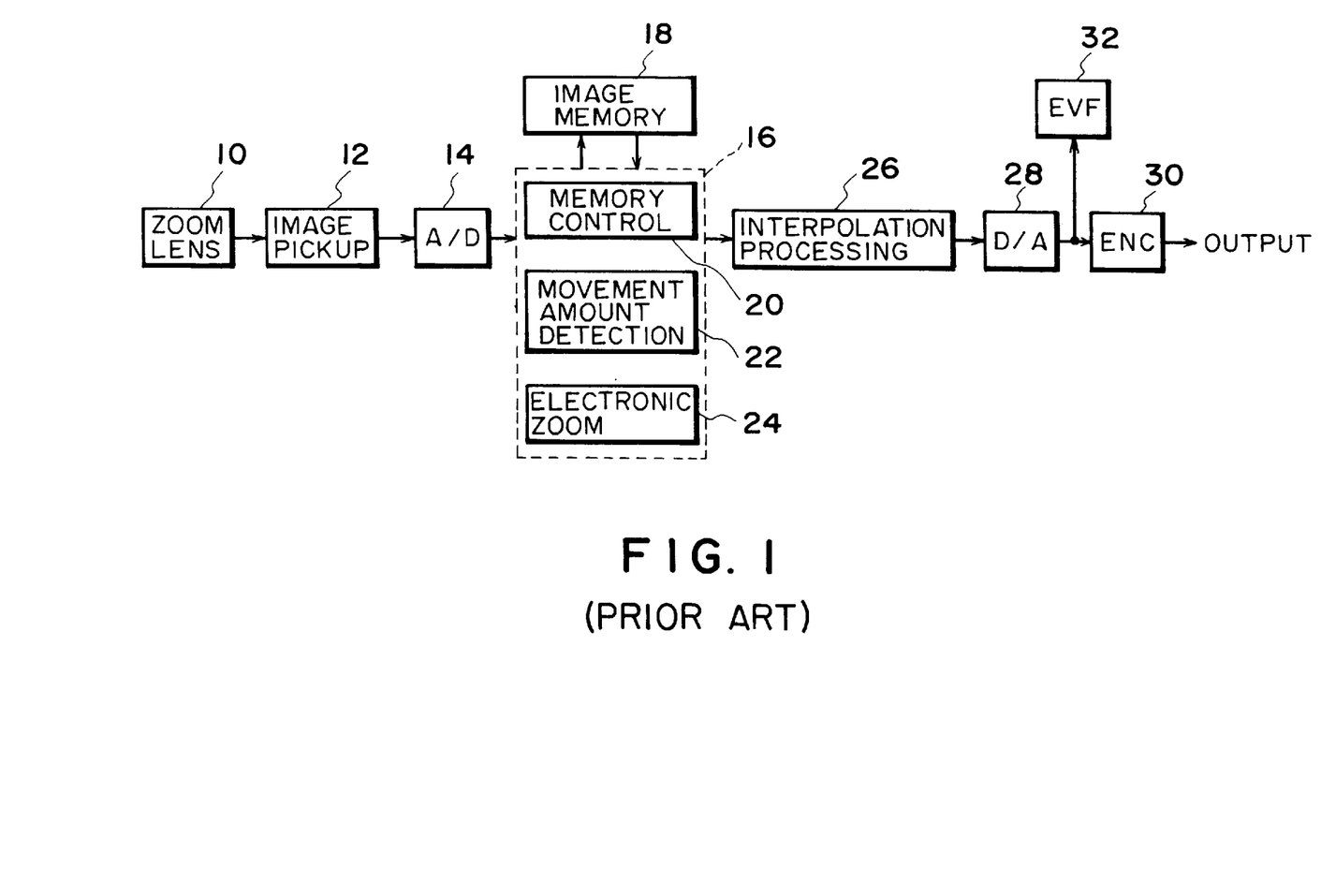
FIG. 1 is a schematic block diagram of an electronic antivibration system.

FIG. 1 is a block diagram of a video camera provided with a circuit for electronically preventing or compensating the image vibration. An image pickup device 12 converts an optical image, formed by a zoom lens 10, into an electrical signal, and an A/D converter 14 converts the output of said image pickup device 12 into a digital signal. An image processing circuit 16 is functionally composed of a memory control circuit 20 for controlling an image memory 18, a movement amount detection circuit 22 for detecting the image movement from the image signal, and an electronic zooming circuit 24, and serves to reduce the image vibration by means of these circuits.

In the above-explained configuration, the image information entered through the zoom lens 10 and the image pickup device 12 is sampled with a predetermined sampling frequency, then converted into a digital signal by the A/D converter 14 and supplied to the image memory 18 through the image processing circuit 16. Then amounts x, y of movement in the horizontal and vertical directions are determined by the correlation of said signal with the next field or frame, and a control circuit 4 reads the image information from the image memory 18, with a reference point displaced according to said amounts of movement.

Figure 2:
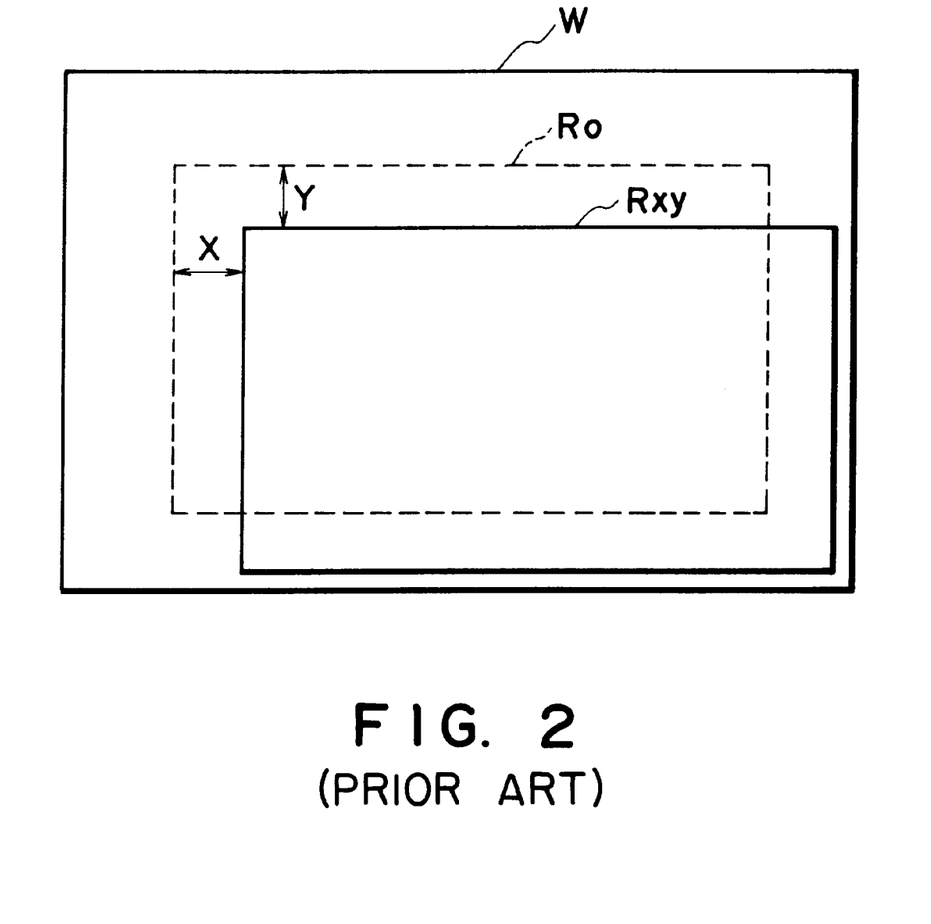
FIG. 2 is a view showing the function of the electronic antivibration system shown in FIG. 1.

Referring to FIG. 2, an area W indicates the storage area of the image signal in the image memory 18 and is always constant. An area $R_0$ is the read-out area of the image signal from the image memory 18 when said amounts of movement are zero, while an area $R_{xy}$ is the read-out area of the image signal when said amounts of movement are X and Y respectively in the horizontal and vertical directions. The image signal thus read from the image memory is compensated for the vibration and provides a stabler image which is more comfortable to watch.

Within the entire image W stored in the image memory 18, the image processing circuit 16, when the image vibration compensating function is activated, reads a central portion $R_0$ from the image memory 18 and expands said portion to the size W by the electronic zooming circuit 24, for supply to an interpolation circuit 26.

When the movement amount detection circuit 22 detects a movement of the image, the area of extraction from the entire area W is moved in a direction compensating said movement, for example to an area $R_{xy}$ shown in FIG. 2, and the extracted image is expanded to the size of the area W by the electronic zooming circuit 24 and is subjected to interpolation between the lines or between the pixels in the interpolation circuit 26.

Thus the interpolation circuit 26 replenishes the pixel data which have become deficient by the expansion in the electronic zooming circuit 24, and a D/A converter 28 converts thus interpolated image data into an analog signal. Thus the output of the D/A converter 28 is a moving image signal with reduced image vibration. A video encoder 30 converts the output of the D/A converter 28 into a predetermined format, for example an NTSC video signal. The output of the D/A converter 28 is also supplied to an electronic view finder (EVF) 32, for image display. The EVF 32 may also be given the output of the video encoder 30.

The above-explained configuration is however unable to completely compensate the image vibration when it is large, so that the target object may vibrate significantly within the image frame or may disappear from the image frame and re-appear therein.

Also in the above-explained configuration, since the image signal already subjected to compensation of image vibration is displayed on the monitor, the photographer tends to misunderstand that the vibration caused by his hands is limited and depends on the image vibration compensating function even though he is in a situation capable of suppressing the vibration of the hands. For example in case of image recording with a camcorder, there is recorded an image with vibration which should have been avoided.

Also in the image vibration compensating device explained above, the read-out image is displaced in parallel manner corresponding to the vibration of the image, and the image has to be expanded in order to avoid the lack of image at an end portion, resulting from such image displacement. Stated differently, the image is expanded when the compensation for image vibration is in action.

If said compensation for image vibration is turned on and off, there will result deterioration of the image quality by a sudden change in the image angle, caused by the presence and absence of said image expansion.

SUMMARY OF THE INVENTION

In consideration of the foregoing, a first object of the present invention is to provide an image pickup device provided with electronic zooming and optical zooming functions, capable of eliminating discontinuity in the image angles of said electronic and optical zoomings, thereby enabling a natural zooming operation.

A second object of the present invention is to provide an image pickup device capable of controlling the optical zooming according to the function state of the electronic zooming, thereby achieving smooth switching between the electronic zooming and the optical zooming.

A third object of the present invention is to provide an image pickup device capable of compensating the change in image angle, when the electronic zooming is turned off, by controlling the optical zooming, thereby achieving a satisfactory zooming operation.

The above-mentioned objects can be attained, according to a preferred embodiment of the present invention, by an image pickup device provided with electronic image vibration compensating means, comprising electronic zooming means for electronically varying the image magnification of a designated portion of the taken image, a zoom lens constituting a phototaking lens, zoom detection means for detecting the zooming position of said zoom lens, drive means for zooming said zoom lens, and control means for linked control of said zoom lens and said electronic zooming means so as to maintain the image angle obtained by said zoom lens and said electronic zooming means at a designated value.

Also in another preferred embodiment of the present invention, there is provided an image pickup device provided with a zoom lens serving as a phototaking lens, image pickup means for converting an optical image formed by said zoom lens into an electrical signal and electronic zooming means for electronically varying the magnification of a designated portion of the image taken by said image pickup means, comprising control means for linked control of said zoom lens and said electronic zooming means so as to maintain the image angle, obtained by said zoom lens and said electronic zooming means, at a designated value.

Also in still another preferred embodiment of the present invention, there is provided an image pickup device provided with electronic zooming means for electronically expanding the taken image, comprising frame superposing means for superposing a frame signal, indicating an image portion to be expanded by said electronic zooming means, with said taken image, and image display means for selectively displaying the output image of said frame superposing means and the output image of said electronic zooming means.

A fourth object of the present invention is to provide an image pickup device capable of compensating the image vibration while maintaining a constant image angle by cooperation of optical zooming and electronic zooming, thereby suppressing or reducing the image vibration within a wider area while stabilizing the target object in the image frame.

A fifth object of the present invention is to provide an image pickup device capable of displaying, on the monitor, a frame signal indicating the image output area in superposition on the taken image, thereby enabling to visually confirm the image output area within the taken image area, and, also during the compensation for image vibration, enabling to visually confirm the state of compensation.

A sixth object of the present invention is to provide an antivibration device for an image pickup device, capable of suppressing an abrupt variation in the image angle and avoiding the influence of vibration of the hands, thereby providing a stable image which does not given unpleasant feeling to the photographer.

The above-mentioned objects can be attained, according to a preferred embodiment of the present invention, by an image pickup device provided with detection means for detecting the amount of vibration of the device or of movement of the image information, memory means for storing said image information, and readout means for reading predetermined image information from said memory means in such a manner as to compensate the vibration of the device or of the image information, comprising cut-out area control means for controlling the read-out area from the image information stored in said memory means, calculation means for calculating magnification information for expanding said image information according to the cut-out area determined by said cut-out area control means, zoom magnification control means for controlling the zoom magnification of an optical system of said device, and comparator means for comparing the magnification information according to said cut-out area and the zoom magnification of said optical system.

A seventh object of the present invention is to provide a recording or reproducing device enabling compensation for the image movement at the reproduction of an image signal.

The above-mentioned object can be attained, according to a preferred embodiment of the present invention, by a recording or reproducing device comprising an image pickup device for converting an optical image, obtained from an optical system into an electrical signal, recording or reproducing means for recording or reproducing an image signal, memory means allowing writing or reading of the image signal, vibration compensating means for reducing the vibration component of said image signal by controlling the image signal stored in said memory means, and image input selection means capable of selecting the signal to be written into said memory means, either from the image signal released from said image pickup device or from the image signal supplied from said recording or reproducing means.

Thus there is provided an image pickup device which, in the image taking operation, controls the read-out area of the image information stored in the memory means by means of the cut-out area control means, then calculates the magnification of expansion of the image information by the calculation means according to the cut-out area of said cut-out area control means, also controls the zoom magnification of the optical system by the control means, and compares the zoom magnification determined by said cut-out area and that of said optical system by the comparator means, thereby enabling optimum zooming control.

Also there is provided an image pickup device in which the vibration component of the image signal is reduced by controlling the image signal stored in the memory means by means of the vibration compensating means, and the signal to be stored in said memory means is selected, by the image input selection means, either from the image signal released from the image pickup device or from the image signal supplied from the recording or reproducing means.

Still other objects of the present invention, and the features thereof, will become fully apparent from the following description, to be taken in conjunction with the attached drawings.

DETAILED DESCRIPTION OF THE PREFERRED EMBODIMENTS

In the following there will be explained a first embodiment of the present invention, with reference to the attached drawings.

1st Embodiment

Figure 3:
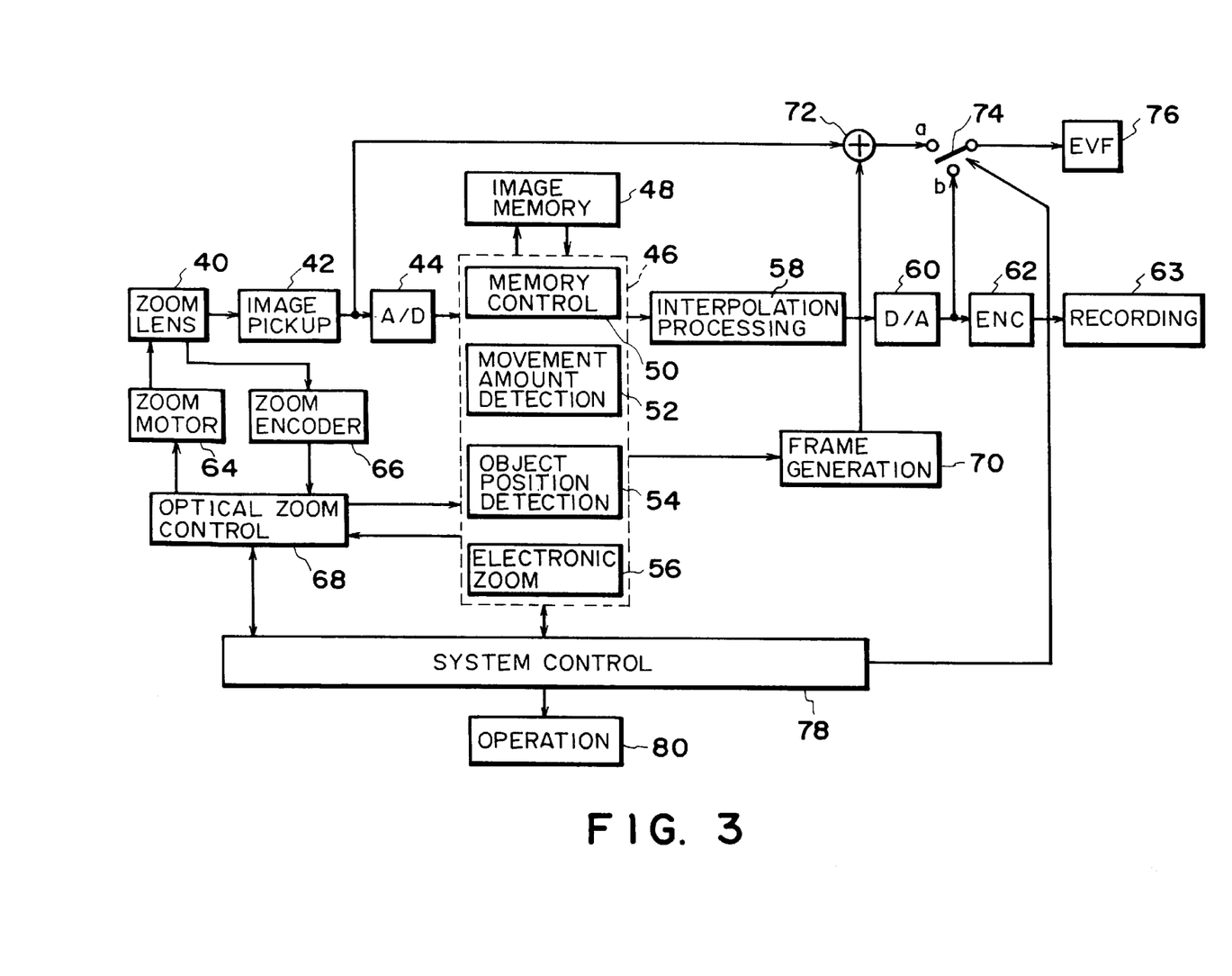
FIG. 3 is a block diagram showing a first embodiment of the image pickup device of the present invention.

FIG. 3 is a schematic block diagram of an embodiment of the present invention, wherein shown are a zoom lens 40 constituting a phototaking lens; a photosensor 42 for converting an optical image, formed by the zoom lens 40, into an electrical signal; an A/D converter 44 for converting the analog output signal of the photosensor 42 into a digital signal; and an image processing circuit 46 for reducing the image vibration by detecting the amount of movement of the image, utilizing an image memory 48. Said image processing circuit 46 is provided with a memory control circuit 50 for controlling the image memory 48, a movement amount detection circuit 52 for detecting the amount of movement of the image by calculation between the image frames, an object position detection circuit 54 for detecting the object position, and an electronic zooming circuit 56 for effecting image expansion or the like.

The object position detection circuit 54 tracks a designated object image (for example an image at the center of the image frame at the start of a phototaking operation or at the manipulation of an object designating switch in an operation unit 80 to be explained later) and detects and stores the object position over several fields (or frames). The algorithm for detection is similar to that for detecting the amount of movement, and is capable of detecting the movement of an arbitrary object image and tracking the same by comparative calculation of the image information of plural image fields.

There are further shown an interpolation circuit 58 for interpolating necessary data between the lines or between the pixels of an image, electronically expanded by the electronic zooming circuit 56 in the compensation of vibration by the image processing circuit 46; a D/A converter 60 for converting the output of the interpolation circuit 58 into an analog signal; and a video encoder 62 for converting the image signal from the D/A converter 60 into a video signal of a predetermined format, for example of NTSC format. The output of said video encoder 62 is supplied to an image recording apparatus 63 such as a video tape recorder or a video cassette recorder.

There are further shown a zooming motor 64 for varying the magnification of the zoom lens 40; a zoom encoder 66 for detecting the zooming position of the zoom lens 40; an optical zoom controlling circuit 68 for controlling the zooming motor 64 according to the output of the zoom encoder 66 and the control signal from the image processing circuit 46; a frame generation circuit 70 for generating a frame signal to be displayed in an extracted portion $R_{xy}$ in the entire image frame W (cf. FIG. 2), during the image vibration compensating function, according to a timing signal from the image processing circuit 46 (more specifically from the memory control circuit 50); an adder 72 for adding the frame signal, generated from the frame generation circuit 70, to the output of the image sensor 42; a selector switch 74 for selecting either the output of the adder 72 (at a contact a) or the output of the D/A converter 60 (at a contact b); and an electronic view finder (EVF) 76 for displaying an image of the signal selected by said switch 74.

Also there are provided a system control circuit 78 composed of a microcomputer and serving to control the entire system, particularly the image processing circuit 46, the optical zoom control circuit 68 and the switch 74; and an operation unit 80 provided with keys and switches for entering instructions into the system control circuit 78.

In the present embodiment, when the image vibration exceeds a certain level so that the object cannot be stabilized, the optical zoom control circuit 68 varies the magnification of the zoom lens 40 so as to maintain the image vibration within a range processable by the image processing circuit 46, and the electronic zooming circuit 56 varies the magnification of the electronic zooming so as to cancel the variation in the image angle resulting from the variation in the magnification of the zoom lens 40, thereby maintaining a constant phototaking image angle.

Figure 4:
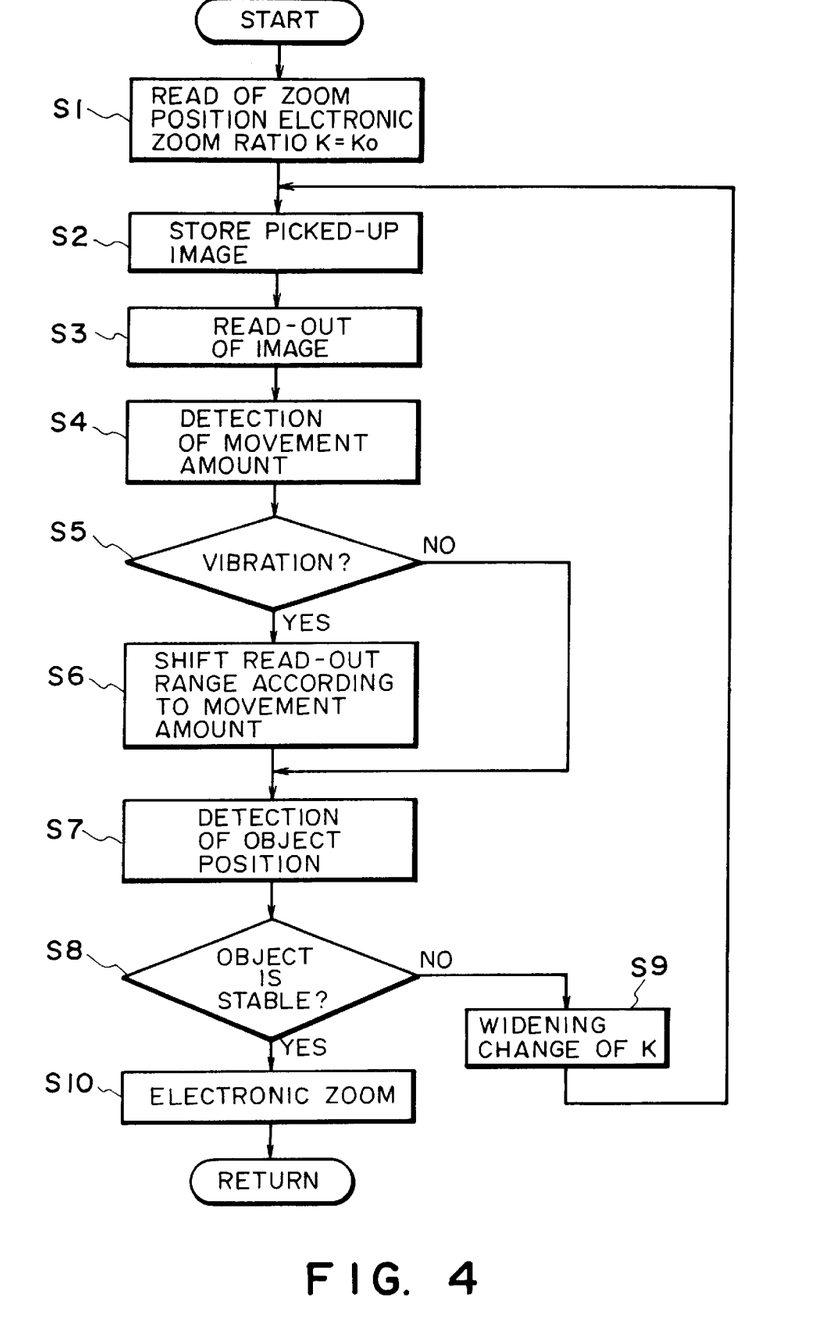
FIG. 4 is a flow chart showing the function of the image pickup device shown in FIG. 3.

This control sequence will be explained with reference to a flow chart shown in FIG. 4.

At first there is executed initialization (S1). More specifically, the zoom position of the zoom lens 40 is read from the output of the zoom encoder 66, and an initial value $K_0$ is set for the rate of expansion of the electronic zooming.

Then the image taken by the image sensor 42 is stored in the image memory 48 (S2). More specifically, the image signal released from the image sensor 42 is converted by the A/D converter into a digital signal, which is written into the image memory 48 by the memory control circuit 50 of the image processing circuit 46.

Then the movement amount detection circuit 52 of the image processing circuit 46 reads the image data stored in the image memory 48, and detects the amounts of movement in the x- and y-directions, by comparative calculation with the image data of a next image frame supplied from the A/D converter 44 (S4).

If the detected amounts of movement indicate an image vibration exceeding a predetermined level (S5), the read-out area from the image memory 48 is displaced, in the memory control circuit 50, by amounts compensating the detected amounts of movement. Thus a new read-out area $R_{xy}$ shown in FIG. 2 is set in the memory control circuit 50 (S6). If the image is practically free from vibration, the initial read-out area $R_0$ is set in the memory control circuit 50.

Then the object position detection circuit 54 detects the current object position (S7), by referring to the image data stored in the image memory 48, those of a next image frame released from the A/D converter 44, and the stored past object position. The image processing circuit 46 discriminates whether the object is vibrating on the image frame, based on the current and past object positions (S8).

If the object is not stabilized (S8), the image processing circuit 46 instructs the optical zoom control circuit 68 to shift the zoom lens 40 to a wider image angle, and regulates the zoom rate K of the electronic zooming circuit 56 so as to maintain a constant image angle by the combination of the optical zooming of the zoom lens 40 and the electronic zooming (S9). In response to said instruction, the optical zoom control circuit 68 drives the zooming motor 64 by a predetermined amount, thereby shifting the magnification of the zoom lens 40 by a predetermined unit toward the wider image angle. Subsequently the sequence returns to the step S2 to effect again the storage of the taken image into the image memory 48 (S2) and the detection of amounts of movement (S4).

On the other hand, if the object is stabilized (S8), the electronic zooming circuit 56 effects the electronic zooming with a preset zoom rate K (S10). More specifically, the image data of the read-out area set in the step S5 are read from the image memory 48, then expanded with the zoom rate K and supplied to the interpolation circuit 58, which effects interpolation on the pixel data which have become deficient by the electronic zooming. The D/A converter 60 converts thus interpolated image data into an analog signal, which is converted by the video encoder 62 into a video signal of NTSC format. The output of the video encoder 62 is a video signal with reduced image vibration.

The above-explained combination of the optical zooming allows to suppress or reduce the image vibration, while stabilizing the target object within the image area. There is also provided an advantage that the phototaking operation can be continued with a constant image angle.

Also in the present embodiment, the effect of compensation of the image vibration can be visually conformed on the monitor image. The user instructs the system control circuit 78 through the operation unit 80, whether the image already subjected to the compensation of vibration or that prior to said compensation is to be displayed on the monitor. In response the system control circuit 78 connects the switch 74 to the contact b for displaying the image subjected to said compensation of vibration, or to the contact a for displaying the image prior to said compensation.

In case of monitor display of the image prior to the compensation of vibration, the image processing circuit 46 supplies the frame generation circuit 70 with the positional information of the read-out area $R_{xy}$ from the image memory 48, based on the result of detection of the amounts of movement by the movement amount detection circuit 52. In response said frame generation circuit 70 generates a frame signal, for displaying a frame surrounding the read-out area $R_{xy}$. The adder 72 adds the frame signal, from the frame generation circuit 70, to the image signal released from the image sensor 42, and supplies the added signal to the contact a of the switch 72. The output of the adder 72 is supplied, through said switch 72, to the electronic view finder 76.

Thus the EVF 76 displays the image signal of the entire taken image W, with a superposed frame indicating the read-out area $R_{xy}$, whereby the photographer can visually confirm the effect of compensation of the image vibration. When the zoom lens 40 is shifted to a wider image angle, there is also varied the frame displayed by the frame signal from the frame generation circuit 70, so that the photographer can also visually confirm the division of functions of the optical and electronic zooming, and can therefore select more appropriate phototaking conditions.

Naturally the image processing circuit 46 continues to effect the compensation of vibration as explained above, and the D/A converter 60 provides the image signal after said compensation of vibration, which is converted into a video signal by the video encoder 62 and supplied to the image recording apparatus 63, which thus records thus compensated image signal.

In case of monitor display of the taken image after compensation of the vibration, the output of the D/A converter 60 is supplied through the switch 74 to the EVF 76. Thus the EVF 76 receives the image signal already subjected to the compensation of vibration, so that the photographer can visually confirm the effect of compensation of the vibration.

In the above-explained embodiment, in the compensation of the vibration of the image sensor, there is conducted an image processing of expanding a part of the taken image of the ordinary image size to a predetermined size, but it is naturally applicable also to an image pickup device provided with an image vibration compensating circuit or an antivibration circuit which employs an image sensor with an image pickup area larger than the ordinary image size and the output pixel area is selected according to the detected amounts of movement.

As will be easily understood from the foregoing description, the above-explained embodiment allows to suppress or reduce the image vibration, while stabilizing the target object in the image area. Also a frame signal, indicating the output image area, is superposed on the taken image displayed on the monitor, so that visual confirmation is rendered possible on the image output area within the taken image area, and also on the status of compensation of the vibration.

2nd Embodiment

In the following there will be explained a 2nd embodiment of the present invention, for avoiding discontinuity in the image angle, utilizing the electronic zooming and the optical zooming.

More specifically, the variation in the image angle resulting from the switching between the active and inactive states of the electronic antivibration is compensated by the optical zooming.

Figure 5:
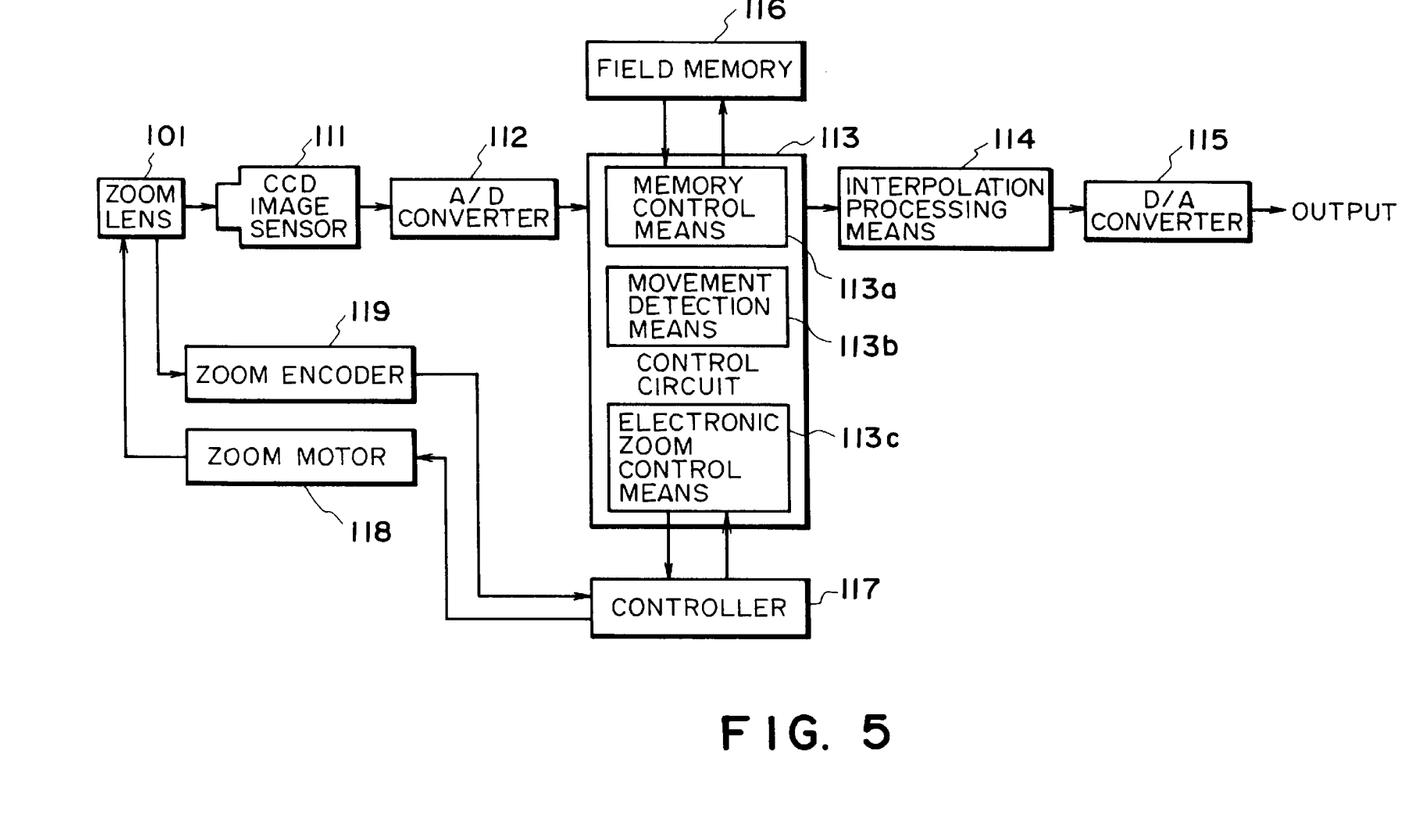
FIG. 5 is a block diagram of an image pickup device provided with an antivibration device, constituting a second embodiment of the present invention.

FIG. 5 is a block diagram of an image pickup device with an antivibration device, constituting a second embodiment of the present invention, wherein shown are a zoom lens (optical system) 101 for forming an optical image; an image sensor (CCD image sensor) 111 for converting said optical image into an electrical signal; an A/D converter 112; and a control circuit 113 which serves to detect the vibration of the image signal from the image sensor 111, determine the amounts of movement of said image signal, obtain the image information from a field memory 116, to be explained later, in a predetermined manner so as to reduce the vibration component of said image signal according to thus determined amounts of vibration and expand the entire image, and is provided with memory control means 113a, movement amount detection means 113b and electronic zoom control means 113c.

There are further provided interpolation means 114 for generating an interpolated pixel signal from the image information of two or more adjacent pixels; an A/D converter 115; a field memory 116 for write-in and read-out of the image information, connected to the memory control means 113a; and a controller 117 for controlling the electronic zooming and the optical zooming, connected to the electronic zoom control means 113c, a zooming motor 118 for displacing the zoom lens 110, and an encoder 119 for detecting the zoom ratio of the zoom lens 110.

In the following explained is the function of the antivibration device of the present embodiment explained above.

The optical image formed by the zoom lens 110 is converted into an electrical signal by the image sensor 111. Thus obtained image signal is converted by the A/D converter 112 into a digital signal, and the image information of a field is stored in the field memory 116. Said image information is also supplied to the control circuit 113, for detecting the amounts of movement in the same manner as in the aforementioned conventional circuit. The image signal stored in the field memory 116 is read, according to thus detected amounts of movement.

Then, in order to convert the size of the image signal read from the field memory 116 into the original scanning width of the output image, there is determined the number of pixels required per normal output period of a pixel, and an interpolation is accordingly conducted by the interpolation means 114. Thus interpolated signal is converted by the D/A converter 115 into an analog signal.

In such configuration, if the device is shifted for example from the active state of antivibration function to the deactivated state, the image angle is abruptly reduced because the image is expanded in said active state in order to avoid the lack of image at the end portion.

However, an extremely smooth transition from the active state of antivibration to the deactivated state can be achieved, without the change in the image angle, when an unrepresented selector switch is manipulated, by shifting the optical zooming toward the telephoto side corresponding to the amount of image expansion in the antivibration function.

This can be achieved by the control of magnification of the zoom lens 10 and that of the electronic zooming, by means of the controller 117.

Figure 6:
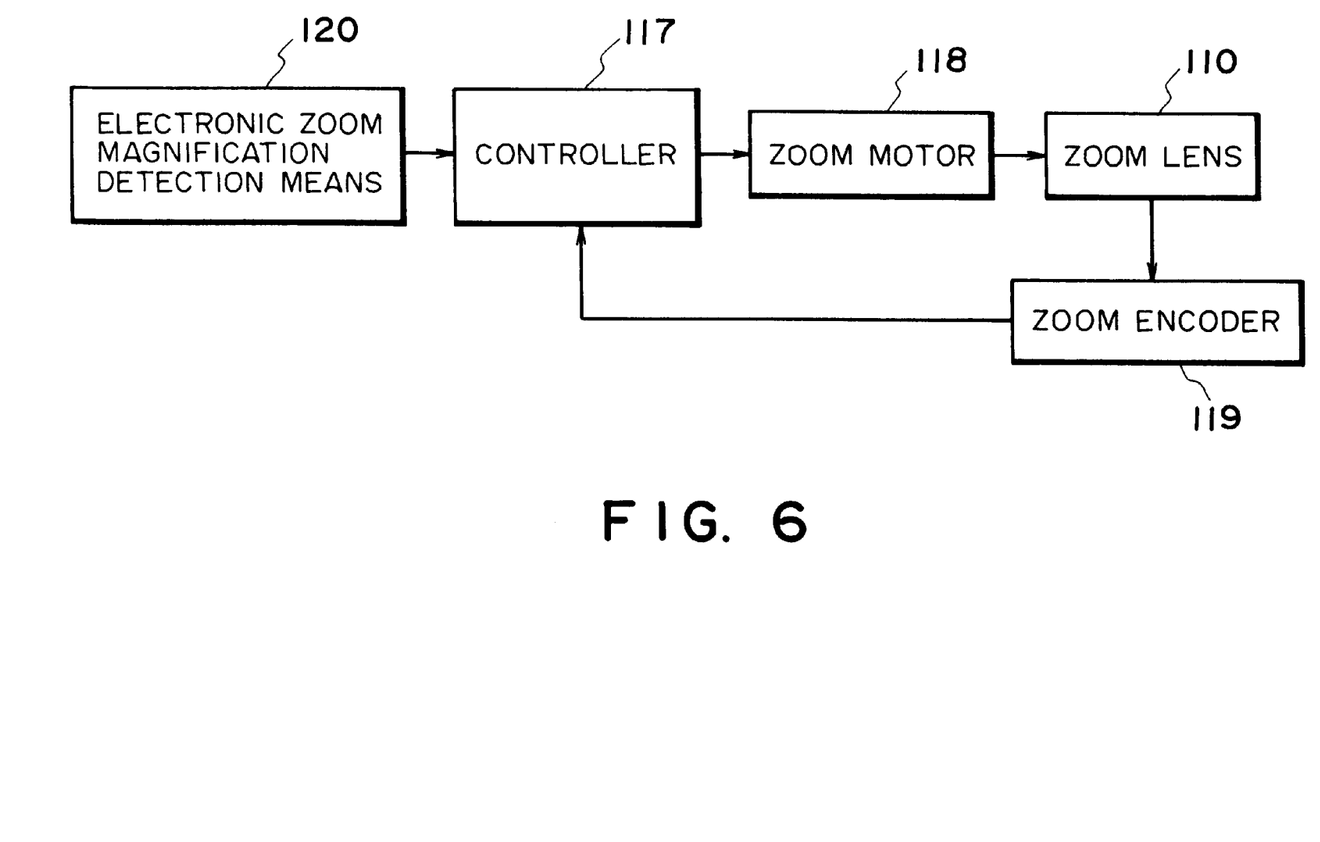
FIG. 6 is a block diagram showing the control state of said antivibration device.

FIG. 6 is a block diagram showing the control state in such situation.

Information on the magnification of electronic zooming, obtained from electronic zoom magnification detection means 120, is supplied to the controller 117, and a control signal therefrom is supplied to the zooming motor 118 to displace the zoom lens 110. The position of said zoom lens 110 is detected by the encoder 119, and the detection signal therefrom is supplied to the controller 117.

When said selector switch is shifted from the active state of antivibration to the deactivated state, the electronic zoom control means 113c gradually reduces the magnification of electronic zooming to a predetermined value, and the zooming motor 118 is controlled according to said information on the magnification of electronic zooming, from the electronic zoom magnification detection means 120, to displace the zoom lens 110 thereby controlling the optical zooming so as to maintain the previous image angle.

On the other hand, when said selector switch is shifted from the deactivated state of antivibration to the active state, the magnification of electronic zooming is gradually increased to a predetermined value, and the zooming motor 118 is controlled according to said information on the magnification of electronic zooming, to displace the zoom lens 110 thereby controlling the optical zooming so as to maintain the previous image angle.

Figure 8:
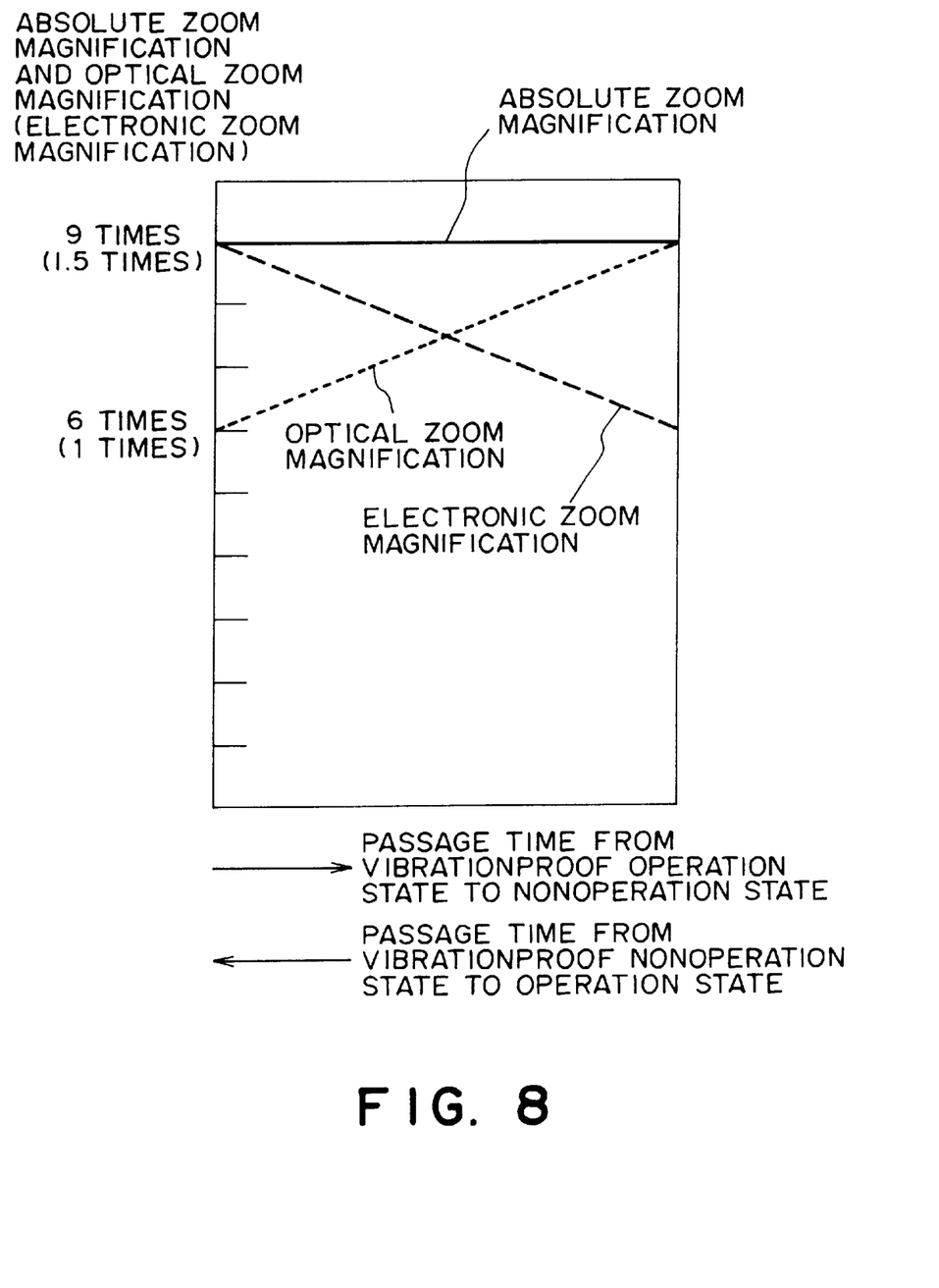
FIGS. 8 and 9 are charts showing the relation between the optical zooming magnification and the electronic zooming magnification in said antivibration device.

In an example of such control, the electronic zoom magnification and the optical zoom magnification are normalized with respect to the image angle so that the absolute magnification can be determined by the multiplication of the two, and, when the electronic zoom magnification is gradually increased or decreased, the optical zooming system is so controlled as to maintain said absolute magnification constant until the electronic zooming is terminated, as shown in FIG. 8. In this embodiment the optical zooming has a magnification of 9 times or larger, and, in the active state of antivibration, the electronic zoom magnification is 1.5 times, corresponding to the aforementioned cut-out size.

Figure 7:
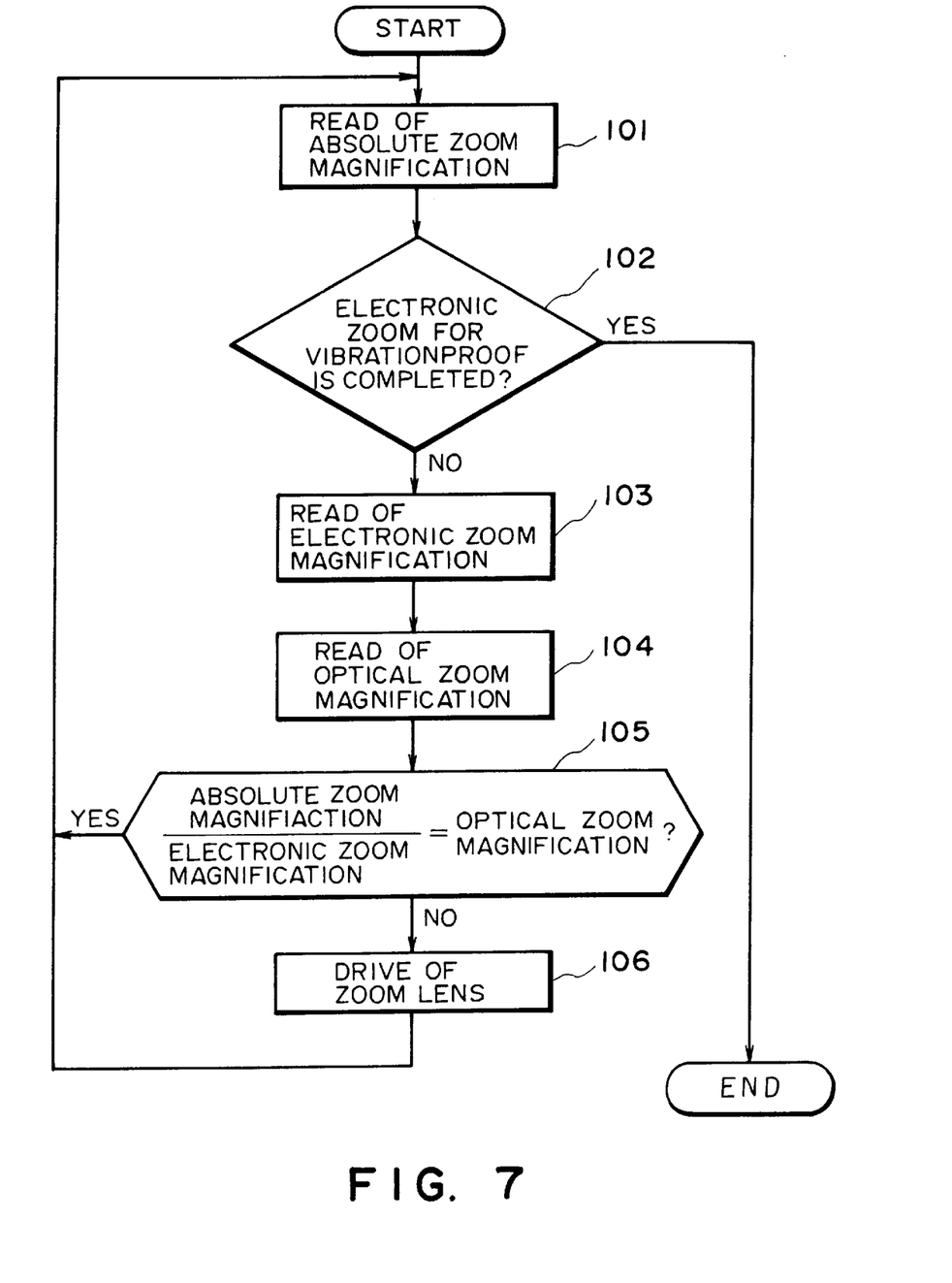
FIG. 7 is a flow chart showing the control sequence of said antivibration device.

The sequence of such control will be explained with reference to a flow chart shown in FIG. 7. When a switching is conducted between the active and deactivated states of antivibration, the absolute zoom magnification is at first read and stored (step 101). Then there is discriminated whether the electronic zooming operation for the antivibration is completed (step 102), and, if completed, the present control sequence is terminated. If not completed, the electronic zoom magnification is read (step 103), and then the optical zoom magnification is read (step 104). Then there is discriminated, based on thus read magnifications, whether the following equation (1) is satisfied:

$$\frac{\text{absolute zoom magnification}}{\text{electronic zoom magnification}} = \text{optical zoom magnification} \quad (1)$$

If the equation (1) is satisfied, the sequence returns to the step 101. If not satisfied, the zoom lens 110 is driven to control the optical zooming (step 106), thereby maintaining the absolute zoom magnification at a constant value. Subsequently the sequence returns to the step 101.

Figure 9:
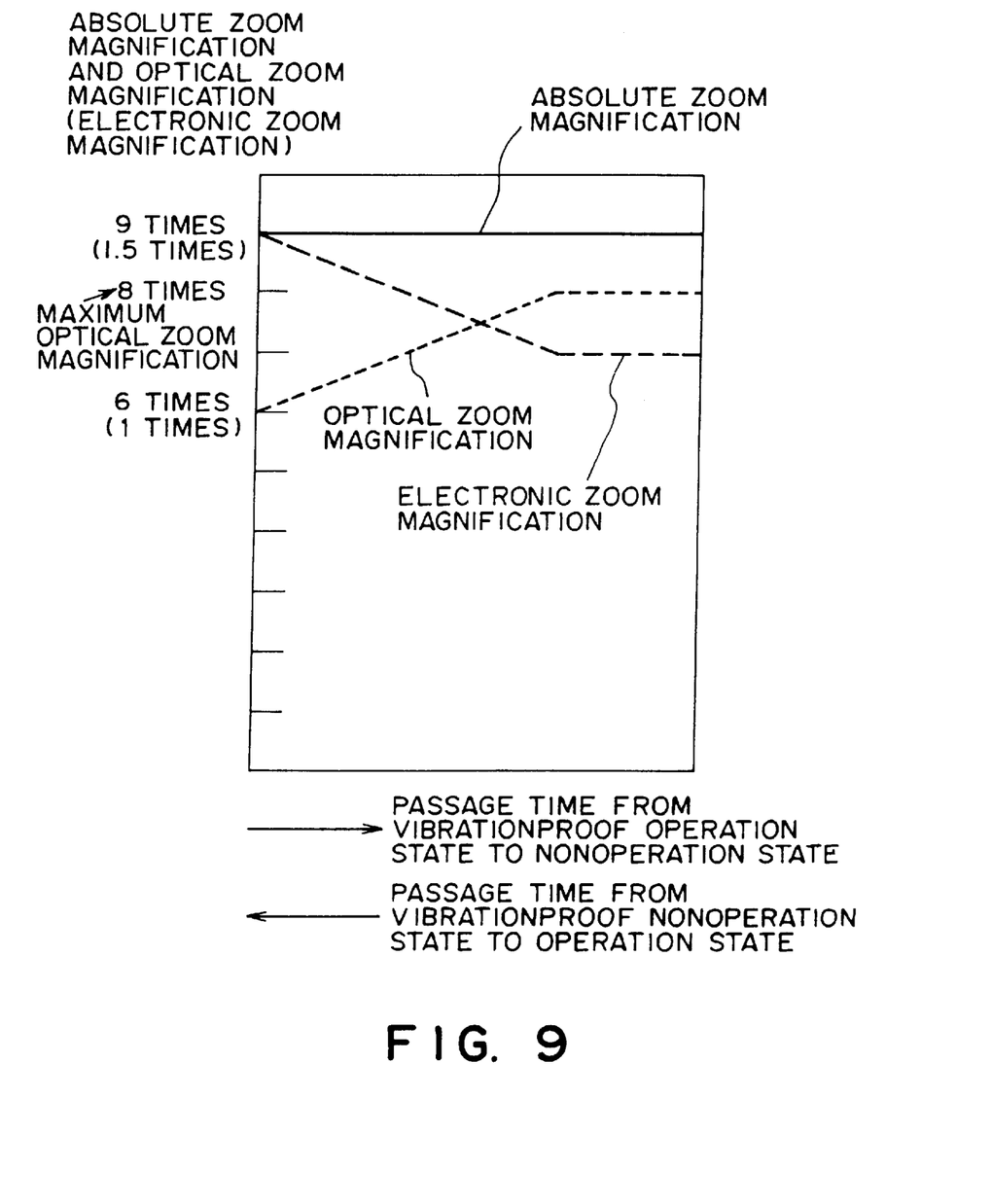

If the above-explained control is executed while the zoom magnification is externally varied, said control is conducted with a zooming speed which is the same as that of said external zooming operaiton. Also if said absolute zoom magnification exceeds the magnification of the optical zooming, the compensation by the optical zooming alone is no longer possible. Consequently the electronic zooming system is maintained at a magnification when the optical zooming system reaches the maximum image angle. FIG. 9 shows an example of variations in time of the zoom magnifications. In this example, the maximum value of the optical zoom magnification is 8 times.

If the image angle of the optical zoom magnification alone is less than the minimum image angle enabling the antivibration function, the transition to the active state of antivibration is inhibited until an external authorization is given, whereby the photographer is allowed to select an arbitrary image angle. In this case, the command for transition to the active state of antivibration is withheld, and said active state is initiated when the image angle of the optical zooming exceeds the minimum image angle enabling the antivibration or when a change in the image angle is externally permitted.

This function is extremely useful when the priority is to be given to the image angle, also in consideration of a fact that the vibration is not conspicuous in the vicinity of the minimum image angle.

3rd Embodiment

In the following there will be explained a 3rd embodiment of the present invention, with reference to FIG. 10, which is a block diagram showing the control state of an antivibration device in the image pickup device of the present embodiment.

Figure 10:
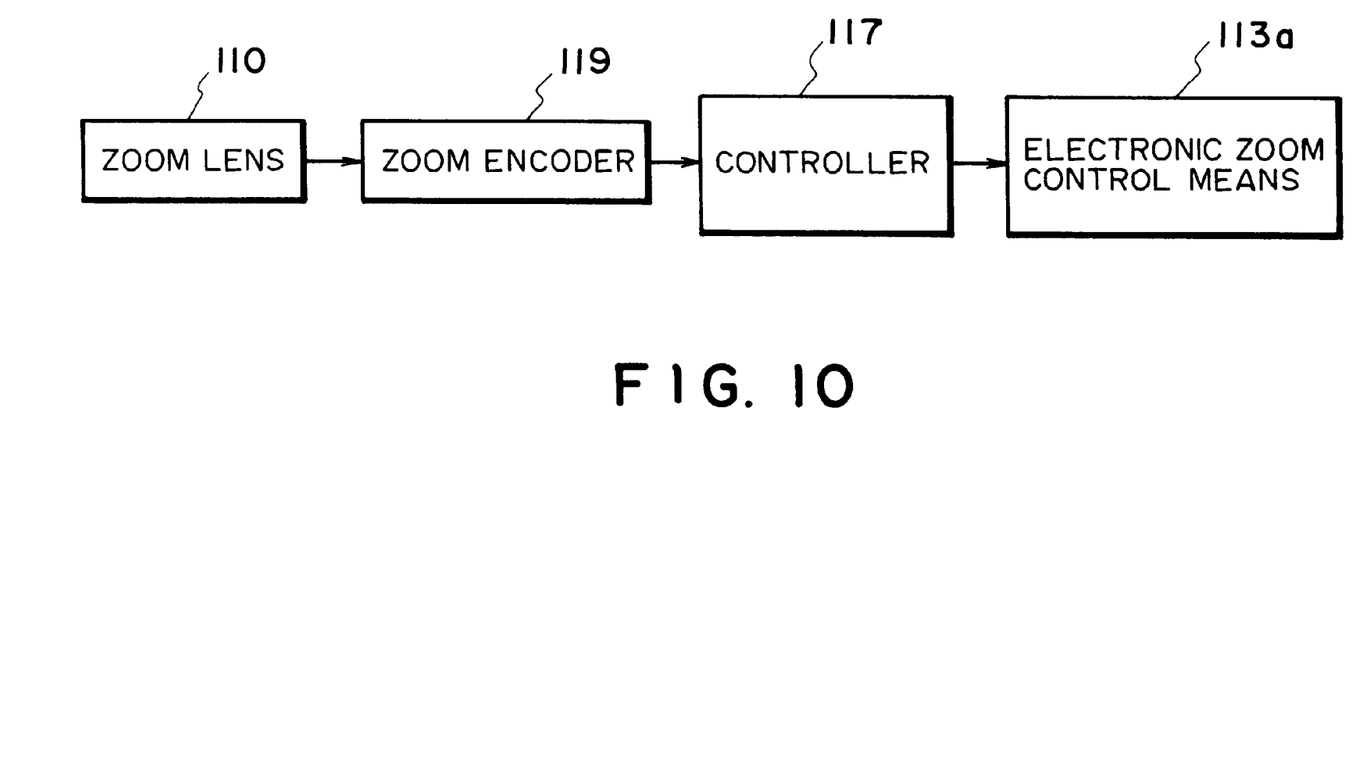
FIG. 10 is a block diagram showing the control sequence of an antivibration device constituting a third embodiment of the present invention.

Referring to FIG. 10, the magnification of a zoom lens 110 is detected by a zoom encoder 119, of which detection signal, constituting optical zoom information, is supplied to a controller 117. Said controller 117 supplies electronic zoom control means 113a with a control signal to control the electronic zooming.

More specifically, when the selector switch is shifted from the active state of antivibration to the deactivated state, the magnification of optical zooming (zoom lens 110) is gradually decreased, and, based on the optical zoom information from the zoom encoder 119, the electronic zoom control means 113c controls the electronic zooming so as to maintain the previous image angle.

On the other hand, when the selector switch is shifted from the deactivated state of antivibration to the active state, the magnification of the optical zooming is gradually increased, and, based on the optical zoom information from the zoom encoder 119, the electronic zoom control means 113a controls the electronic zooming so as to maintain the previous image angle.

4th Embodiment

In the following there will be explained a 4th embodiment of the present invention, with reference to FIG. 11, which is a block diagram of an antivibration device of the image pickup device of the present embodiment, wherein same components as those in FIG. 5 are represented by same symbols and will not be explained further.

The antivibration device of the present embodiment is provided, in the system shown in FIG. 1, additionally with two switches 121, 122 thereby rendering the signal input to the A/D converter 112 selectable from the CCD image sensor 111, an image signal record/reproducing apparatus 123 or an external output terminal (line out) 124.

Figure 11:
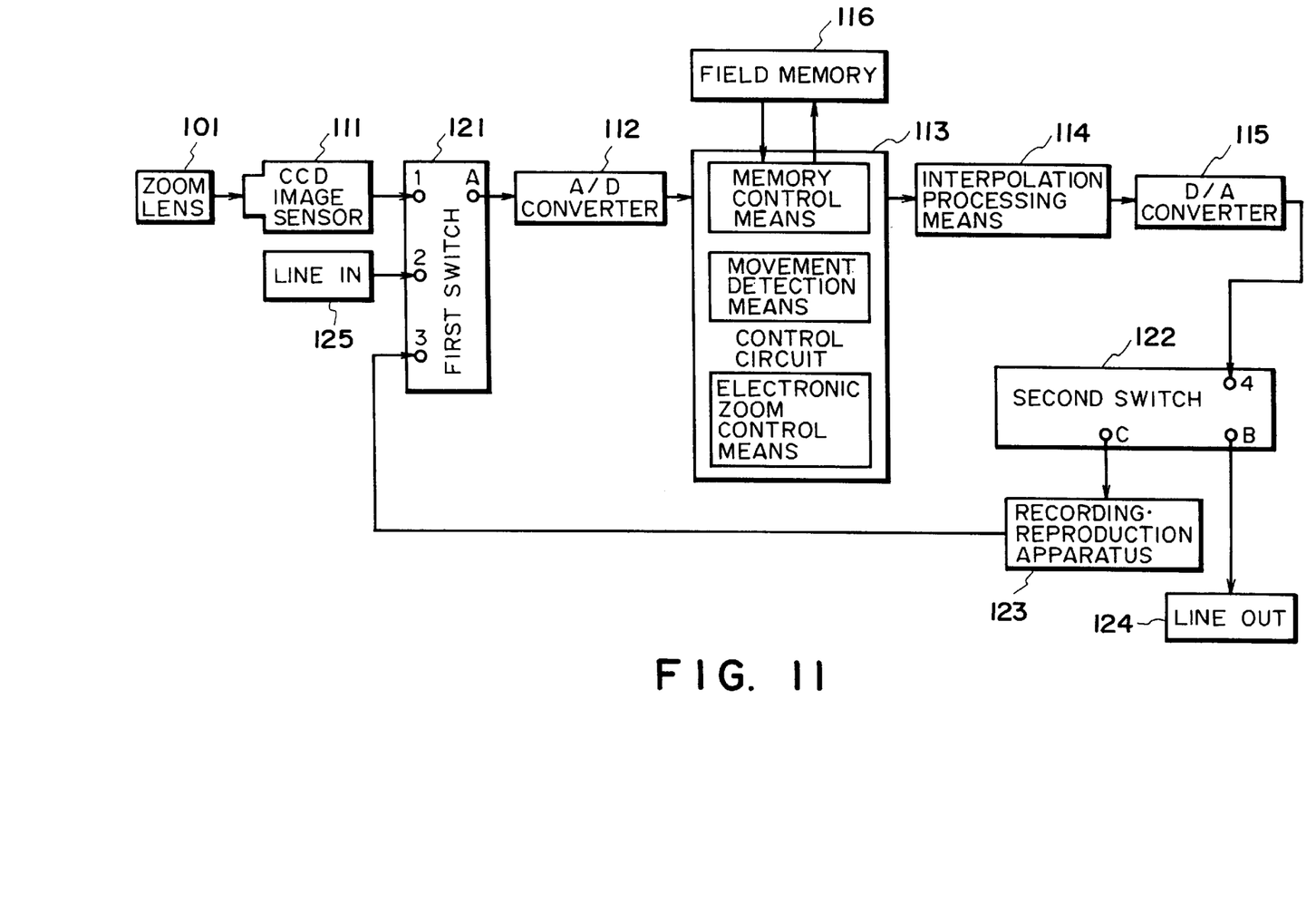
FIG. 11 is a block diagram of an image pickup device provided with an antivibration device, constituting a fourth embodiment of the present invention.

In the configuration shown in FIG. 11, when the first switch 121 is placed in a position 1-A and the second switch 122 is placed in a position 4-B, the antivibration function can be attained at the phototaking operation as in the aforementioned conventional example.

When the first and second switches 121, 122 are respectively placed in positions 3-A and 4-C, the image signal reproduced from the apparatus 123 is converted into a digital signal by the A/D converter 112, and the image information of a field is stored in the field memory 116. At the same time said image information is supplied to the control circuit 113, for detecting the amounts of movement as in the conventional configuration. The image signal stored in the field memory is read, according to thus detected amounts of movement.

In order to convert the read-out size from the field memory 116 into the original size of the scanning width, there is determined the number of pixels required per ordinary output period of a pixel, and an interpolation is executed on the signal read from the field memory 116, by the interpolation means 114. The interpolated signal is converted by the D/A converter 115 into an analog signal, which is supplied to an external output terminal 117 or a view finder (not shown).

Also when the first and second switches 121, 122 are respectively placed in positions 2-A and 4-C, the image signal entered from an external input terminal (line in ) 125 is processed as explained above and is recorded by the record/reproducing apparatus 123.

This configuration allows to use the electronic zooming function also during the reproducing operation.

As explained in the foregoing, in an antivibration device for electrically processing the image information obtained after a phototaking operation and eliminating the component of image vibration, the foregoing embodiment of the present invention controls the magnifications of electronic zooming and optical zooming in correlated manner at the shifting between the active and deactivated states of said antivibration device, thereby achieving smooth switching between such active and deactivated states of the antivibration device, thus enabling a smooth phototaking operation.

Also in an antivibration device for electrically processing the image information obtained after a phototaking operation and eliminating the component of image vibration, the foregoing embodiment of the present invention provides input selector means for selecting the signal to be stored in the memory means from either the output image signal of the image sensor or the image signal reproduced from a record/reproducing apparatus, wherein a single device enables not only a phototaking operation with antivibration function but also preparation of a stable image with compensation of vibration, in an arbitrary portion of the recorded image obtained after a phototaking operation.

What is claimed is:

1. An image pickup device comprising:

electronic zoom means for performing an electronic zoom operation on a designated portion of a picked-up image with changeable magnification;

a zoom lens; and control means operative upon vibration amount of said device greater than a predetermined value for controlling said electronic zoom means and said zoom lens to drive said zoom lens so as to reduce motion of an image formed by said zoom lens and to control said electronic zoom means to correct the image angle of the designated portion of the image changed by the driving of said zoom lens by the electronic zoom operation by said electronic zoom means.

2. A device according to claim 1, further comprising:

frame superposing means for superposing a frame signal indicating an image portion to be expanded by electronic zoom means within a taken image, to said taken image; and image display means for selectively displaying the output image of said frame superposing means or the output image of said electronic zoom means.

3. An apparatus according to claim 1, wherein said control means controls said zoom lens and said electronic zoom means to drive said zoom lens to move said zoom lens in a wide direction and to maintain the image angle obtained by said zoom lens and said electronic zoom means at a designated value by correcting change of the image angle caused by the driving of said zoom lens by the electronic zoom means when the vibration amount is greater than the predetermined value.

4. An apparatus according to claim 1, wherein said electronic zoom means includes a memory for storing an image signal and memory control means for variably controlling a read out area of said memory, and said control means changes the read out area according to the movement.

5. An apparatus according to claim 4, further comprising movement detecting means for detecting a movement vector from the image signal and estimating the vibration amount.

6. An image pickup device provided with a zoom lens, image pickup means for converting an optical image formed by said zoom lens into an electrical signal, and electronic zoom means for electronically converting the magnification of a designated portion of the image taken by said image pickup means, comprising:

a control device operative upon vibration amount of said device greater than a predetermined value for controlling said zoom lens and said electronic zoom means to drive said zoom lens so as to reduce motion of an image formed by said zoom lens and to maintain the image angle obtained by said zoom lens and said electronic zoom means at a designated value by correcting change of the image angle caused by the driving of said zoom lens by the electronic zoom operation of said electronic zoom means.

7. An apparatus according to claim 6, wherein said control means controls said zoom lens and said electronic zoom means to drive said zoom lens in a wide direction and to maintain the image angle obtained by said zoom lens and said electronic zoom means at a designated value by correcting change of the image angle caused by the driving of said zoom lens by the electronic zoom means when the vibration amount is greater than the predetermined value.

8. An apparatus according to claim 6, wherein said electronic zoom means includes a memory for storing an image signal and memory control means for variable controlling a read out area of said memory, and said control means changes the read out area according to the movement.

9. An appareatus according to claim 8, further comprising movement detecting means for detecting a movement vector from the image signal and estimating the vibration amount.

10. An apparatus according to claim 2, further comprising displaying means for displaying an area corresponding to the designated portion in an image screen.

11. An image pickup device having active and deactivated states of antivibration comprising:

detection means for detecting the amount of vibration of image information;

memory means for storing said image information;

read-out means for controlling a read-out area of said memory means so as to reduce the vibration of said image information according to detection of the vibration by said detection means;

calculation means for calculating the magnification for expanding said image information, according to a size of the read-out area;

zoom magnification control means for controlling the zoom magnification of an optical system of the device; and control means for controlling to maintain a total magnification of the zoom magnification determined on the size of the read-out area and the zoom magnification of said optical system when said image pickup device is shifted between the active antivibration and the deactivated antivibration states.

12. An image pickup device according to claim 11, further comprising:

selector means for arbitrarily selecting an active state or a deactivated state of antivibration function; and wherein said control means controls the zoom magnification of the read-out area from said memory means and the zoom magnification of said optical system in mutually correlated manner, at the switching from said active state to said deactivated state or from said deactivated state to said active state of anti-vibration function, so as to maintain the image angle prior to said switching.

13. An image pickup device according to claim 11, comprising control means for controlling the zoom magnification determined by the read-out area from said memory means and the zoom magnification of said optical system in such a manner that the product of said zoom magnifications becomes constant.

14. An image pickup device according to claim 11, further comprising correction means which, in case the image angle defined by the zoom magnification determined by said read-out area and the zoom magnification of said optical system exceeds the mazimum image angle of the zoom magnification alone of said optical system, preferentially sets the zoom magnification of said optical system at the maximum image angle and corrects the deficient image angle by the zoom magnification of said read-cut area.

15. An image pickup device according to claim 11, further comprising:

inhibiting means which, in case the image angle by the zoom magnification alone of said optical system is less than the minimum image angle enabling the antivibration, inhibits the transition to the active state of antivibration until an external permission is obtained.

16. An image pickup device according to claim 15, comprising:

releasing means for releasing the inhibition for transition to the active state of antivibration by said inhibiting means, when the image angle by the zoom magnification alone of said optical system exceeds the minimum image angle enabling the antivibration.

17. A magnification control apparatus comprising:

optical zoom means for optically varying a magnification;

electronic zoom means for electrically varying the magnification;

movement correction means for correcting a movement of an image caused by a movement of said apparatus;

control means for controlling said optical zoom means said electronic zoom means to maintain a total magnification defined by said optical zoom means and said electronic zoom means when said movement correction means is shifted between an operating state and non-operating state.

18. An apparatus according to claim 17, wherein said electronic zoom means has a memory for storing an image signal and memory control means for variably controlling a read out area of said memory and said control means changes the read out area according to the movement of the image.

19. An apparatus according to claim 18, wherein movement correction means includes detecting means for detecting a movement vector from the image signal and estimating the vibration amount and correcting means for correcting said electronic zoom by variably controlling the read out area on the basis of the movement vector.

20. An apparatus according to claim 27, further comprising:

selector means for arbitrarily selecting the operating state or the non-operating state of said movement correction means; and wherein said control means controls the magnification of said electronic zoom means and the magnification of said optical zoom means in mutually correlate manner, at the switching from said operating state to said non-operating state or from said non-operating state to said operating state, so as to maintain the total magnification.

* * * * *

UNITED STATES PATENT AND TRADEMARK OFFICE
CERTIFICATE OF CORRECTION

PATENT NO. : 6,172,707 B1
DATED : January 9, 2001
INVENTOR(S) : Toshimichi Ouchi et al.

It is certified that error appears in the above-identified patent and that said Letters Patent is hereby corrected as shown below:

Column 13,
Line 11, delete "variable" and insert -- variably --.
Line 17, delete "claim 2" and insert -- claim 6 --.

Column 14,
Line 48, delete "claim 27" and insert -- claim 18 --.

Signed and Sealed this

First Day of January, 2002

*Attest:*

*Attesting Officer*

JAMES E. ROGAN
*Director of the United States Patent and Trademark Office*